United States Patent
Anderson et al.

(10) Patent No.: US 10,474,618 B2
(45) Date of Patent: Nov. 12, 2019

(54) DEBUG DATA SAVING IN HOST MEMORY ON PCIE SOLID STATE DRIVE

(71) Applicant: Western Digital Technologies, Inc., San Jose, CA (US)

(72) Inventors: Michael J. Anderson, Rochester, MN (US); Adam Michael Espeseth, Rochester, MN (US); Brandon William Schulz, Rochester, MN (US); Lee Anton Sendelbach, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 1057 days.

(21) Appl. No.: 14/476,930

(22) Filed: Sep. 4, 2014

(65) Prior Publication Data
US 2016/0070486 A1 Mar. 10, 2016

(51) Int. Cl.
| G06F 12/00 | (2006.01) |
| G06F 13/00 | (2006.01) |
| G06F 13/28 | (2006.01) |
| G06F 13/42 | (2006.01) |
| G06F 11/07 | (2006.01) |

(52) U.S. Cl.
CPC .......... G06F 13/4221 (2013.01); *G06F 11/07* (2013.01); *G06F 11/0751* (2013.01)

(58) Field of Classification Search
CPC .............. G06F 17/30088; G06F 11/07; G06F 11/0751; G03F 2201/84
USPC ........................................................ 711/103
See application file for complete search history.

(56) References Cited

U.S. PATENT DOCUMENTS

| 4,443,865 | A | * | 4/1984 | Schultz | G06F 8/41 712/242 |
| 6,502,208 | B1 | * | 12/2002 | McLaughlin | G06F 11/0772 714/25 |
| 6,889,341 | B2 | * | 5/2005 | Collins | G06F 11/3055 714/22 |
| 7,308,609 | B2 | * | 12/2007 | Dickenson | G06F 11/2268 714/15 |
| 7,455,223 | B1 | * | 11/2008 | Wilson | G06Q 20/18 221/9 |
| 7,978,516 | B2 | | 7/2011 | Olbrich et al. | |
| 8,489,817 | B2 | | 7/2013 | Flynn et al. | |
| 2004/0078666 | A1 | * | 4/2004 | Aasheim | G06F 3/0619 714/24 |
| 2005/0138302 | A1 | * | 6/2005 | Lusk | G11C 29/1201 711/154 |
| 2010/0115193 | A1 | * | 5/2010 | Manus | G06F 12/0804 711/103 |

(Continued)

OTHER PUBLICATIONS

"Power Failure and Flash Storage" pp. 1-6, 2013 http://www.storage-switzerland.com/Articles/Entries/2013/4/10_Power_Failure_and_Flash_Storage.html.

(Continued)

*Primary Examiner* — Charles Rones
*Assistant Examiner* — Sidney Li
(74) *Attorney, Agent, or Firm* — Patterson & Sheridan, LLP; Steven H. Versteeg

(57) ABSTRACT

A method, apparatus, and system are provided for implementing debug data saving in host memory on a Peripheral Component Interconnect Express (PCIE) solid state drive (SSD). Upon Power Loss Interruption (PLI) event detected in a solid state drive (SSD), the SSD transfers debug data directly to the host system main (DRAM) memory via a Peripheral Component Interconnect Express (PCIE) bus.

20 Claims, 4 Drawing Sheets

(56) References Cited

U.S. PATENT DOCUMENTS

| | | | | |
|---|---|---|---|---|
| 2010/0280995 A1* | 11/2010 | Munegowda | ....... | G06F 11/1435 |
| | | | | 707/648 |
| 2011/0302476 A1 | 12/2011 | Lee et al. | | |
| 2014/0107995 A1* | 4/2014 | Kostick | ............... | G06F 17/5009 |
| | | | | 703/13 |
| 2014/0173357 A1* | 6/2014 | Anderson | ........... | G06F 11/0778 |
| | | | | 714/45 |
| 2014/0313281 A1* | 10/2014 | Graff | ...................... | H04N 7/152 |
| | | | | 348/14.09 |

OTHER PUBLICATIONS

"2.5" SATA 6Gb/s SSD (SM843T)" pp. 1-30, Mar. 2013 http://www.mullet.se/dokument/SM843T_Specification_v1.0.pdf, 32 pages.

"Advantages of Solid State Drives (SSD) in PXI Systems", Aug. 29, 2013 http://www.ni.com/white-paper/7482/en/, 5 pages.

"OSSD: A Case for Object-based Solid State Drives", IEEE 2013 http://www.storageconference.org/2013/Papers/2013.Paper.29.pdf, 13 pages.

DataWrite Assurance, OCZ.com Aug. 28, 2013 http://ocz.com/enterprise/literature/ssd-technologies/datawrite-assurance, 1 page.

"An Overview of SSDWrite Caching", Micron.com, 2012 http://www.yumpu.com/en/document/view/3800952/an-overview-of-ssd-write-caching-pdf-micron, 5 pages.

"CAP-XX Supercapacitors provide power backup for Solid State Drives", Sep. 19, 2007 http://www.tecategroup.com/white_papers/badnames/CAP-XX_SSD_White_Paper_v0-2.pdf, 18 pages.

"Using InnoDisk's iCell Technology to Prevent Data Loss in SSDs", Jul. 2012 http://www.ampliconbenelux.com/docs/InnoDisk_iCell_Technology_White_Paper.pdf, 5 pages.

* cited by examiner

DEBUG DATA SAVING IN HOST MEMORY ON PCIE SOLID STATE DRIVE

FIELD OF THE INVENTION

The present invention relates generally to the data storage field, and more particularly, relates to a method, apparatus, and system for implementing debug data saving in host memory on a Peripheral Component Interconnect Express (PCIE) solid state drive (SSD).

DESCRIPTION OF THE RELATED ART

Solid state drives (SSDs) based on NAND type flash memory typically are required to be tolerant of an interruption of power without any data loss. SSD drives generally have a non-volatile cache where dirty write data is kept, then this dirty write data must be saved to the NAND flash memory in the event of a Power Loss Interruption (PLI) event. When a PLI event occurs, some type of energy storage device, such as capacitors with a purposefully sustained charge on the SSD drive, provides enough power needed to save such data to the NAND flash memory.

Data saved on a PLI event typically include dirty write cache data and logical block address (LBA) mapping table information, which may include journaling data. Data that may not be saved in a failure PLI event is firmware trace information, which often is key to debugging problems encountered during power loss interruption events.

Resulting problems are first detected in the form of data loss detected by the host or drive, or an LBA mapping coherency problem detected by the drive on the next power on. Various solutions to this problem have been proposed for saving trace data to the NAND during PLI processing, but add to the required storage capacity or capacitance, and several classes of failures such as firmware hangs or hardware faults make this unreliable.

A need exists for an effective mechanism for implementing debug data saving in host memory on Peripheral Component Interconnect Express (PCIE) solid state drive (SSD).

SUMMARY OF THE INVENTION

Aspects of the preferred embodiments are to provide a method, apparatus, and system for implementing debug data saving in host memory on Peripheral Component Interconnect Express (PCIE) solid state drive (SSD). Other important aspects of the preferred embodiments are to provide such method, apparatus, and system substantially without negative effect and to overcome some of the disadvantages of prior art arrangements.

In brief, a method, apparatus, and system are provided for implementing debug data saving in host memory on a Peripheral Component Interconnect Express (PCIE) solid state drive (SSD). Upon Power Loss Interruption (PLI) event detected in a solid state drive (SSD), the SSD transfers debug data directly to the host system main (DRAM) memory via a Peripheral Component Interconnect Express (PCIE) bus.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing debug data saving in host memory on Peripheral Component Interconnect Express (PCIE) solid state drive (SSD).

Figure 1:
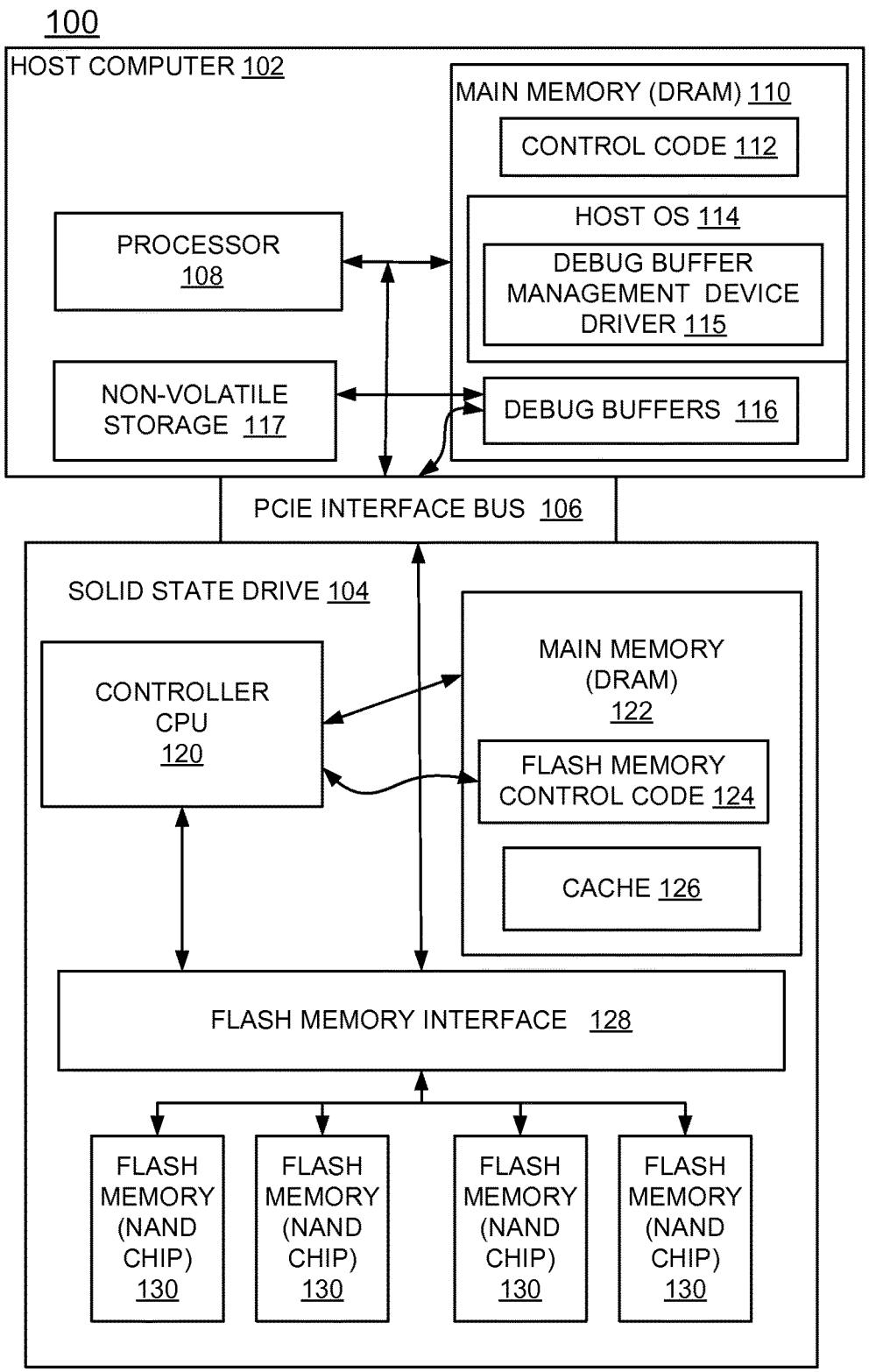
FIG. 1 is a block diagram representation illustrating a system for implementing debug data saving in host memory on Peripheral Component Interconnect Express (PCIE) solid state drive (SSD) in accordance with preferred embodiments.

Having reference now to the drawings, in FIG. 1, there is shown an example system generally designated by the reference character 100 for implementing debug data saving in host memory on Peripheral Component Interconnect Express (PCIE) solid state drive (SSD) in accordance with preferred embodiments. System 100 includes a host computer 102, a solid state drive (SSD) 104, and a Peripheral Component Interconnect Express (PCIE) interface bus 106 connecting the host computer 102 and the storage device 104.

As shown in FIG. 1, host computer 102 includes a processor 108, a main memory 110, such as a dynamic random access memory (DRAM), control code 112, a host operating system 114 including a debug buffer management device driver 115, and one or more debug buffers 116 or a predefined memory range 116 in the host system main memory 110 in accordance with preferred embodiments. The debug buffers 116 are connected to the PCIE interface bus 106 and a separate non-volatile storage 117 in the host computer 100. The debug buffer management device driver 115 creates debug buffers 116 in the host memory 110 for storing debug data transferred by the SSD 104 in accordance with preferred embodiments.

In accordance with preferred embodiments, the debug_snapshot buffer management device driver 115 can store the debug_snapshots to the separate non-volatile storage 117 in the host system 102, and several debug_snapshots can be stored from multiple SSDs to preserve a history. This implementation would vary depending on the application and the storage capabilities in the host system 102.

The PCIE solid state drive (SSD) 104 includes a controller 120 coupled to a main memory 122, implemented with one or a combination of a dynamic random access memory (DRAM), a flash memory, and a static random access memory (SRAM). The PCIE solid state drive (SSD) 104 includes flash memory control code 124 coupled to the controller 120 and cache memory 126, coupled to the PCIE interface bus 106 and a flash memory interface 128 connecting to a flash memory 130, such as one or more flash memory NAND chips 130.

In accordance with preferred embodiments, the PCIE solid state drive (SSD) 104 has capability of reading and writing directly into the host memory 110. Unlike SAS SSDs, these memory reads and writes can be unsolicited by the host computer 102 as long as the memory range is allocated and reserved by a host's device driver, such as debug buffer management device driver 115 allocating the debug buffers 116. The PCIE interface bus or link 106 of SSD 104 continues operating in the event of a Power Loss Interruption (PLI) event with all internal components of SSD 104 being temporarily powered by one or more PLI energy storage devices, such as one or more capacitors (not shown). In accordance with preferred embodiments, PCIE solid state drive (SSD) 104 uses the continuing PLI operating capability to safely store debug information in host memory 110. For example, a host system application such as a Failure Analysis (FA) tool running on the host system 102 together with the debug buffer management device driver 115 allocating debug buffers 116 advantageously is used to retrieve debug information in the event of an SSD failure, such as illustrated and described with respect to FIG. 2.

System 100 including the host computer 102 and the PCIE solid state drive (SSD) 104 is shown in simplified form sufficient for understanding the preferred embodiments. The illustrated host computer 102 together with the PCIE solid state drive (SSD) 104 is not intended to imply architectural or functional limitations. The preferred embodiments can be used with various hardware implementations and systems and various other internal hardware devices.

Figure 2:
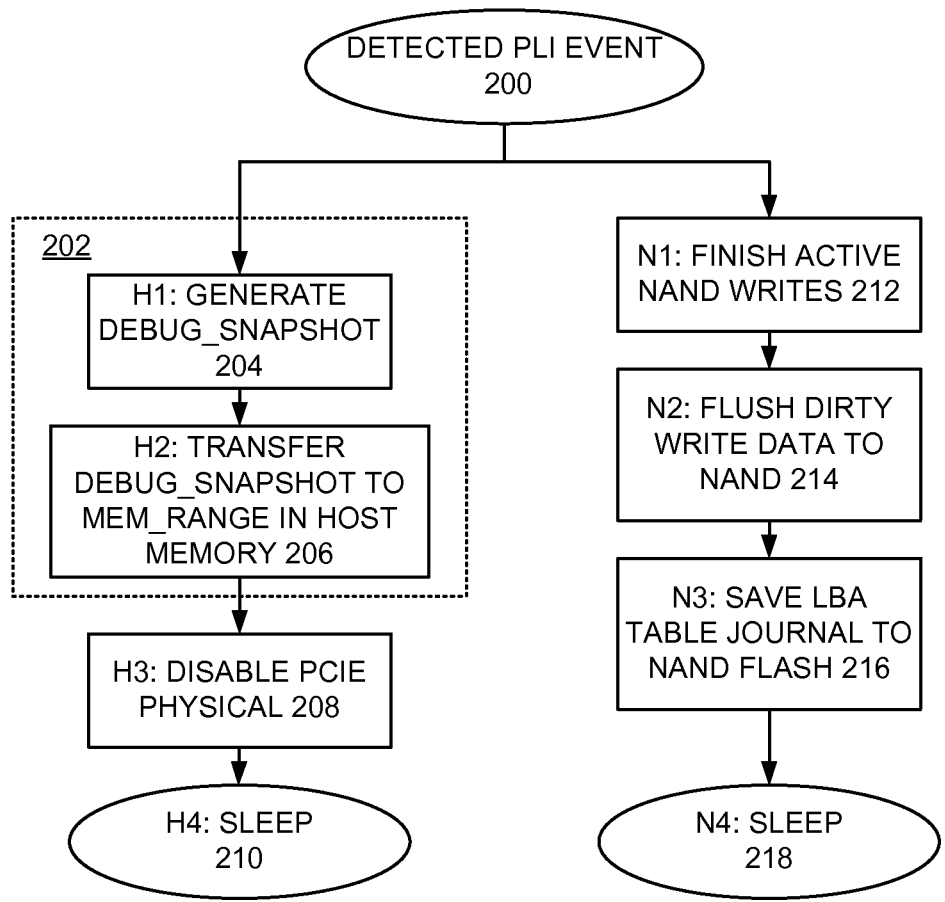
FIGS. 2 and 3 are flow charts illustrating example operations of system of FIG. 1 in accordance with preferred embodiments.

Referring to FIG. 2, there are shown flow charts illustrating example operations of system 100 in accordance with preferred embodiments. In FIG. 2, operations begin with a detected Power Loss Interruption (PLI) event as indicated in a block 200. Upon sudden power loss, or upon receipt of a power-fail warning, in a SSD (Solid State Drive) 104, the SSD transfers debug data captured from internal memories and stored in, for example, a DRAM-buffer or cache data directly to a debug buffer 116 in the host system main (DRAM) memory 110 via PCIE bus 106.

In accordance with preferred embodiments, the buffer management device driver 115 provides debug snapshot buffer management functions in the host operating system 114 which creates debug buffers 116, also referred to as the predefined memory range of memory length at memory starting address in the host memory 110 for each of one or more PCIE SSD 104 in the system 100. A primary device driver informs each PCIE SSD 104 of the debug buffers 116 or predefined memory range of memory length at memory starting address at drive boot time by setting these values in special controller registers in the SSD 104. After a drive PLI event occurs at block 200, then the primary device driver is notified of a drive reset and performs clean up normal resources, however, the debug_snapshot buffers 116 are owned by the buffer management device driver 115, not the primary device driver, and are retained.

In accordance with preferred embodiments as indicated by dotted lines 202 debug saving steps are performed by firmware residing on the SSD 104. A first host side SSD firmware step H1 responsive to the PLI event, generates a debug_snapshot as indicated in a block 204. The debug_snapshot includes specially formatted data with a header that describes the contents and length. The data includes memory ranges, internal variables, hardware register values, and event tracing information. A second host side SSD firmware step H2 transfers the debug_snapshot to a predefined memory range in the host system main memory 110 as indicated in a block 206. The term predefined memory range covers the memory space in host memory starting from memory starting address for memory length. The allocation of this memory space is unique to the preferred embodiments. A minimum size requirement for the predefined memory range is unique to a particular application of the preferred embodiments, such as 4 MB of memory space is allocated for the debug data, and for example a time to transfer a 4 MB debug snapshot on the PCIE interface bus 106, such as a 4x Gen3 PCIE link is approximately 1 ms, and is feasible on existing SSD hardware designs. The collective term used for the debug data is a debug_snapshot generated at block 204. The debug_snapshot could be understood as a crash dump in cases where an SSD failure is detected on a subsequent power-on-reset (POR). In the event of a successful power on after a PLI event, the debug_snapshot data contains no useful information and can be discarded or overwritten. Only in cases where a failure is detected on the next POR is the debug_snapshot data used to debug a problem, for example, as illustrated and described with respect to FIG. 3.

As indicated in a block 208, a next host side SSD firmware step H3, disables the PCIE physical that includes powering down the PCIE physical and other hardware not required for the SSD 104 to process the PLI interrupt. As indicated in a block 210, a next host side SSD firmware step H4 is where a host firmware processor goes to sleep or enters a low power mode with interrupts disabled to conserve power.

In accordance with preferred embodiments, the host side SSD firmware step transfer of debug_snapshot data into host memory 210 occurs in parallel with NAND side SSD firmware PLI activities, for example as separate threads of execution, which optionally includes task switching on a single CPU or completely in parallel on two CPUs of controller CPU 120. On a PLI event, the main job of the host side SSD firmware and hardware is to abruptly stop any host-side transfer and conserve as much power as possible. The NAND side SSD firmware is responsible for saving dirty write data and saving critical LBA table information.

As indicated in a block 212 a first NAND side SSD step N1 responsive to the PLI event, finishes active NAND writes to flash memory NAND chips 130. As indicated in a block 214 a next NAND side SSD step N2 flushes dirty write data that has been acknowledged to the host system to flash memory NAND chips 130. Then as indicated in a block 216 a next NAND side SSD step N3 saves logical block address (LBA) table journal that is required to rebuild the SSD LBA table on a next POR to flash memory NAND chips 130. As indicated in a block 218 a next NAND side SSD step N4 the SSD processor 120 goes to sleep with interrupts disabled. At this step N4, PLI processing is finished. The activities at blocks 212, 214, 216, and 218 represent the critical path for PLI processing. After the PLI interrupt, there is no communication or interlock between host system firmware and SSD firmware.

In accordance with preferred embodiments, when the SSD is powered back on, the host side SSD firmware opens the host interface and waits for the NAND side SSD firmware to successfully complete power-on processing to become ready before reporting read/write readiness to the host. The NAND side SSD firmware reads the last saved LBA table, reads the journal data, and rebuilds the LBA table to reflect writes committed since the last full LBA table save. During this processing, the NAND side SSD firmware could detect a fault or a coherency failure due to a problem encountered during PLI processing. It is very common for this to be a firmware bug or hole or unhandled exception in the SSD firmware PLI processing routine. If this is the case, the SSD debug_snapshot data safely stored in host memory at the predefined memory range is critical for debug. When power to the SSD is interrupted or lost, debug data transferred to the debug buffers 116 are retained, and not cleared by the primary device driver 115. For example, a debug daemon process reads the data in the debug buffers 116, and handles the data appropriately, such as for debug purposes.

Figure 3:
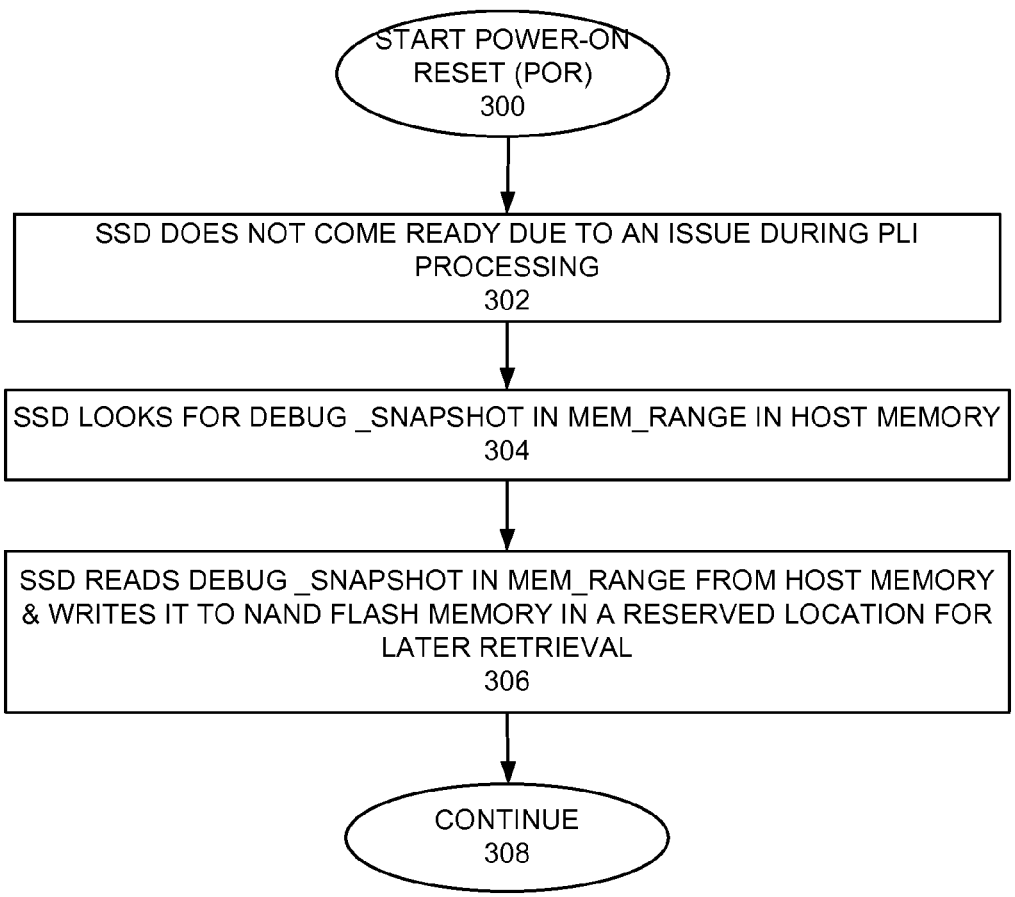

Referring to FIG. 3, operations start on a subsequent power-on-reset (POR) following the PLI event as indicated in a block 300. As indicated in a block 302, the SSD does not come ready due to an issue during PLI processing. As indicated in a block 304, the SSD looks for the debug_snapshot data stored in host memory at the predefined memory range. As indicated in a block 306, the debug_snapshot data remains in the assigned memory range, so the SSD 104 reads the data back from the host memory and writes it to the flash NAND chips 130 in a reserved location for later retrieval. At block 308, the SSD is storing its own debug data and it can be retrieved through existing SSD practices and tools such as log dump. Operations continue as indicated in a block 308.

Figure 4:
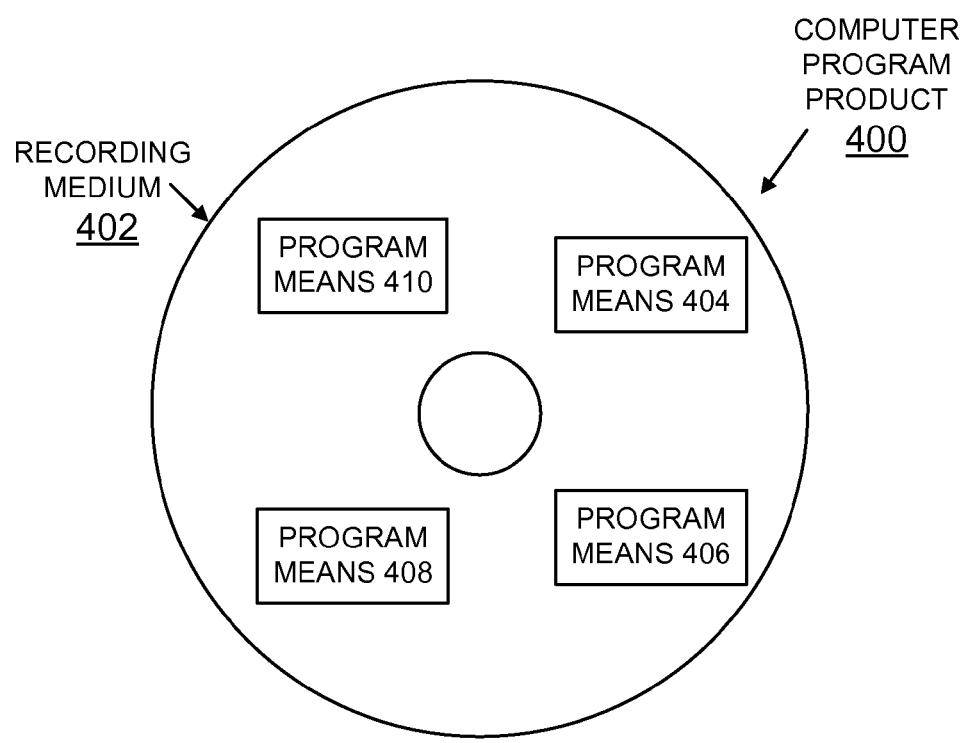
FIG. 4 is a block diagram illustrating a computer program product in accordance with preferred embodiments.

Referring now to FIG. 4, an article of manufacture or a computer program product 400 of the preferred embodiments is illustrated. The computer program product 400 includes a computer readable recording medium 402, such as, a floppy disk, a high capacity read only memory in the form of an optically read compact disk or CD-ROM, a tape, or another similar computer program product. Computer readable recording medium 402 stores program means or control code 404, 406, 408, 410 on the medium 402 for carrying out the methods for implementing debug data saving in host memory 110 on the PCIE SSD 104 in accordance with preferred embodiments in the system 100 of FIG. 1.

A sequence of program instructions or a logical assembly of one or more interrelated modules defined by the recorded program means or control code 404, 406, 408, 410, direct PCIE SSD controller 120 and host OS 114 of the system 100 for implementing debug data saving in host memory 110 on the PCIE SSD 104 of preferred embodiments.

While the present invention has been described with reference to the details of the embodiments of the invention shown in the drawing, these details are not intended to limit the scope of the invention as claimed in the appended claims.

What is claimed is:

1. A method for implementing debug data saving in host memory on a Peripheral Component Interconnect Express (PCIE) solid state drive (SSD) performed by the solid state drive (SSD) and host system, said method comprising:
   detecting a Power Loss Interruption (PLI) event in a solid state drive (SSD);
   responsive to the detected PLI event, generating a debug snapshot including specially formatted data with a header describing contents and length, and including memory ranges, internal variables, hardware register values, and event tracing information; and
   transferring said debug snapshot data directly to a host system main memory via a Peripheral Component Interconnect Express (PCIE) bus, responsive to the detected PLI event.

2. The method as recited in claim 1 wherein transferring debug data directly to a host system main memory via a Peripheral Component Interconnect Express (PCIE) bus includes transferring said debug snapshot data to a predefined memory range in the host system main memory.

3. The method as recited in claim 2 wherein the host system main memory includes a dynamic random access memory (DRAM), and includes defining a debug buffer management device driver in a host system operating system for allocating the predefined memory range in the host system main memory including an allocated memory space having a starting memory address and a predefined memory length.

4. The method as recited in claim 1 wherein transferring said debug snapshot data directly to a host system main memory via a Peripheral Component Interconnect Express (PCIE) bus includes transferring said debug snapshot data to one or more predefined debug buffers in the host system main memory.

5. The method as recited in claim 1 further includes storing debug data to at least one separate non-volatile storage in the host system.

6. The method as recited in claim 1 includes reading stored debug data from the host system main memory and writing the read data to a reserved location in the solid state drive (SSD).

7. An apparatus for implementing debug data saving in host memory on a Peripheral Component Interconnect Express (PCIE) solid state drive (SSD) comprising:
   said solid state drive (SSD) including a controller detecting a Power Loss Interruption (PLI) event;
   said SSD, responsive to the detected PLI event, generating a debug snapshot including specially formatted data with a header describing contents and length, and including memory ranges, internal variables, hardware register values, and event tracing information; and
   said SSD transferring said debug snapshot data directly to a host system main memory via a Peripheral Component Interconnect Express (PCIE) bus, responsive to the detected PLI event.

8. The apparatus as recited in claim 7 includes control code stored on a non-transitory computer readable medium, and wherein said controller and a host operating system use said control code for implementing debug data saving in host memory.

9. The apparatus as recited in claim 7 wherein the solid state drive (SSD) includes flash memory, said flash memory including one or more NAND chips.

10. The apparatus as recited in claim 7 wherein said SSD transfers debug data directly to a predefined memory range in the host system main memory.

11. The apparatus as recited in claim 7 wherein said SSD transfers said debug snapshot data to one or more predefined debug buffers in the host system main memory.

12. The apparatus as recited in claim 7 further includes a host system operating system storing debug data to at least one separate host system non-volatile storage.

13. The apparatus as recited in claim 7 includes said controller reading stored debug data from the host system main memory and writing the read debug data to a reserved location in the solid state drive (SSD).

14. The apparatus as recited in claim 7 wherein said SSD transferring said debug snapshot data directly to a host system main memory via a Peripheral Component Interconnect Express (PCIE) bus, responsive to the PLI event includes said SSD generating said debug snapshot data saved in the solid state drive (SSD) and transferring the debug snapshot data to a predefined memory range in the host system main memory.

15. A system for implementing debug data saving in host memory on a Peripheral Component Interconnect Express (PCIE) solid state drive (SSD) comprising:
- a host computer;
- a solid state drive (SSD);
- a Peripheral Component Interconnect Express (PCIE) bus connecting said host system and said solid state drive (SSD);
- said solid state drive (SSD) including a controller detecting a Power Loss Interruption (PLI) event;
- said SSD responsive to the detected PLI event, generating a debug snapshot including specially formatted data with a header describing contents and length, and including memory ranges, internal variables, hardware register values, and event tracing information; and
- said SSD transferring said debug snapshot data directly to a host system main memory via a Peripheral Component Interconnect Express (PCIE) bus, responsive to the detected PLI event.

16. The system as recited in claim 15 includes control code stored on a non-transitory computer readable medium, and wherein said controller uses said control code for implementing debug data saving.

17. The system as recited in claim 15 wherein said host system transferring drive-side cache data directly to a host system main memory via a Peripheral Component Interconnect Express (PCIE) bus includes said SSD transferring said debug snapshot data to a predefined memory range in the host system main memory.

18. The system as recited in claim 15 wherein said SSD transferring debug data directly to a host system main memory via a Peripheral Component Interconnect Express (PCIE) bus includes said SSD transferring said debug snapshot data to one or more predefined debug buffers in the host system main memory.

19. The system as recited in claim 15 further includes a host system operating system storing debug data to at least one separate host system non-volatile storage.

20. The system as recited in claim 15 includes said controller reading stored debug data from the host system main memory and writing the read data to a reserved location in said solid state drive (SSD).

* * * * *